(12) United States Patent
Ho

(10) Patent No.: US 7,985,009 B2
(45) Date of Patent: Jul. 26, 2011

(54) TWO-SIDE ASYMMETRIC LIGHT-SHIFT ILLUMINATING LENS BODY

(76) Inventor: Yen-Wei Ho, Taichung (TW)

(*) Notice: Subject to any disclaimer, the term of this patent is extended or adjusted under 35 U.S.C. 154(b) by 243 days.

(21) Appl. No.: 12/292,001

(22) Filed: Nov. 10, 2008

(65) Prior Publication Data

US 2010/0073938 A1    Mar. 25, 2010

(30) Foreign Application Priority Data

Sep. 19, 2008   (TW) ................. 97217021 U

(51) Int. Cl.
*F21V 5/04*         (2006.01)

(52) U.S. Cl. ........................ 362/335; 362/326

(58) Field of Classification Search .......... 362/326, 362/335; 359/708
See application file for complete search history.

(56) References Cited

U.S. PATENT DOCUMENTS

| 7,273,299 B2 * | 9/2007 | Parkyn et al. ............. 362/244 |
| 7,347,588 B2 * | 3/2008 | Weigert .................... 362/282 |
| 7,373,014 B1 * | 5/2008 | Mancuso et al. ........... 382/268 |
| 7,674,018 B2 * | 3/2010 | Holder et al. ............ 362/311.06 |
| 2004/0037076 A1 * | 2/2004 | Katoh et al. .............. 362/235 |
| 2007/0029563 A1 * | 2/2007 | Amano et al. ............. 257/98 |

* cited by examiner

*Primary Examiner* — Stephen F Husar
*Assistant Examiner* — James W Cranson

(57) ABSTRACT

A two-side asymmetric light-shift illuminating lens body mainly projecting light from a light emitting device to two asymmetric relative outer directions includes a base having a receiving slot with a downwards opening for receiving a lighting device; a large non-spherical protrusion and a small a large non-spherical protrusion being arranged on two sides of a center light axis on a top surface of the base; a concave curved surface being formed to a border of the two non-spherical protrusions; a concave arc is formed above the receiving slot, outer edge of each non-spherical protrusion being formed with a aft cambered convex lateral. The cambered convex laterals are gradually narrowed along the projecting direction of the center light axis. An angle between a tangent line of the cambered convex lateral and the center light axis is about 10 degrees.

3 Claims, 4 Drawing Sheets

TWO-SIDE ASYMMETRIC LIGHT-SHIFT ILLUMINATING LENS BODY

FIELD OF THE PRESENT INVENTION

The present invention relates to lens body, and particular to lens body equipped with a light emitting device capable of generating two-side illumination by diffusely refracting rays from the light emitting device through at least three different refractions.

DESCRIPTION OF THE PRIOR ART

A prior lens is usually made with a Light Emitting Diode (LED) capsulated inside and with a spherical top for gathering and concentrating the light. However, the light is gathered around the light axis of the source so the light energy is too concentrated. To enlarge the illuminating area, light guiding plate is provided to solve the above problem. To overcome the small illuminating area of the LED, a plurality of LEDs is needed to achieve the uniformity as a flat illuminating source.

Therefore, to efficiently reduce quantity of the LED under the certain area of guiding plate, inventors turn to develop lens for the purpose such as a patent no. U.S. Pat. No. 6,679,621. Through a special appearance design, rays emitted from LED will be refracted perpendicular to a light axis by the lens so as to solve the small illuminating problem mention above. However, an illuminating efficiency will be lowered by multiple reflections and refractions of the structure, insufficient energy around the light axis is caused by too much rays being refracted perpendicular to the light axis.

Based on defects and usage of the previous patent, inventors developed a lens body with more uniform projections on two lateral sides and central area such as a patent no. US 2007/0029563 A1 of LIGHT-EMITTING DIODE AND VEHICULAR LAMP. A LED is sealed packed on a light axis of a lens body. Two convex curved bodies are formed to the lens body along the light axis. A convex curved edge is formed beside the two convex curved bodies. Rays from LED will be diffusely refracted through the curved surface so that the central area will have a more uniformly projection of light.

However, except the technology of illuminating more wide to later side disclosed in above patents, the inventor of the present invention want to provide an optical lens with better functions.

SUMMARY OF THE PRESENT INVENTION

Accordingly, a primary object of the present invention is to provide a two-side asymmetric light-shift illuminating lens body capable of diffusely refracting rays from a center light axis of the lens body so as to generate two-side illuminating distribution. It can be applied to flat illuminating source and it can reduce the quantity of the illuminating source and lower cost of production.

To achieve above objects, the present invention provides a two-side asymmetric light-shift illuminating lens body with two asymmetrical non-spherical protrusions arranged to two sides of a center light axis of the lens body. A concave curved surface is formed to a border of the two asymmetric non-spherical protrusions. Two symmetrical cambered convex laterals are formed on relative outer edges of the non-spherical protrusions. Rays closed to the center light axis will be diffusely refracted to two sides away the center light axis with asymmetric directions by the concave curved surface and the rays will be further more diffusely refracted away from the center light axis by the non-spherical protrusions. By a refraction of light perpendicular to the center light axis through the cambered convex laterals, the light emitting device can project uniformly and asymmetrically on two lateral sides.

Moreover, a preferable embodiment of the present invention provides a receiving slot having a downwards opening for receiving and positioning a lighting device. A concave arc for receiving the light emitting portion of the lighting device is formed to a top side of the receiving slot as a light incident side so as to perform a first diffusely refraction. A second refraction with greater refracting angle will be performed by above concave curved surface, asymmetric non-spherical protrusions, and cambered convex laterals which are a light projecting side

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
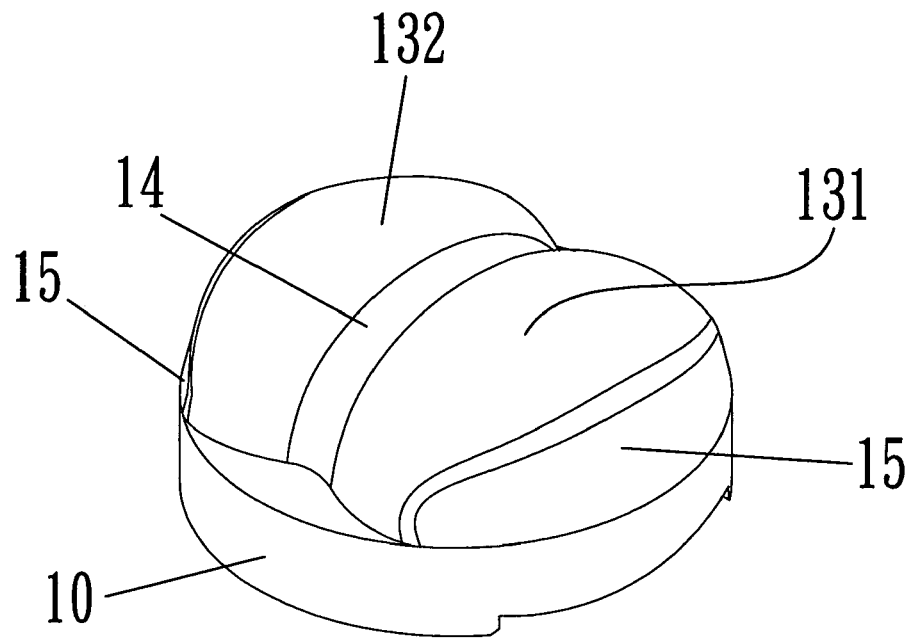
FIG. 1 is a pictorial drawing of a two-side illuminating lens body of the present invention.
Figure 2:
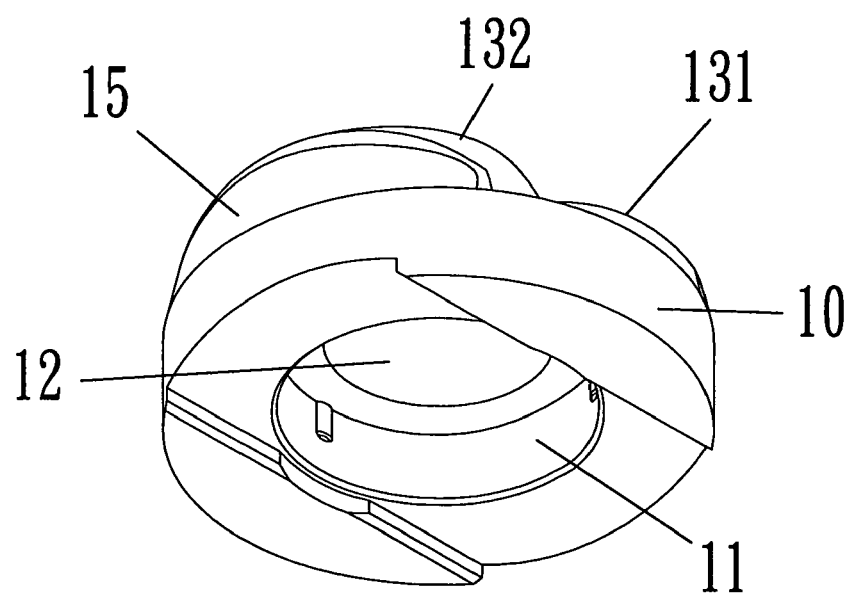
FIG. 2 is a pictorial drawing of a two-side illuminating lens body of the present invention from another angle.
Figure 3:
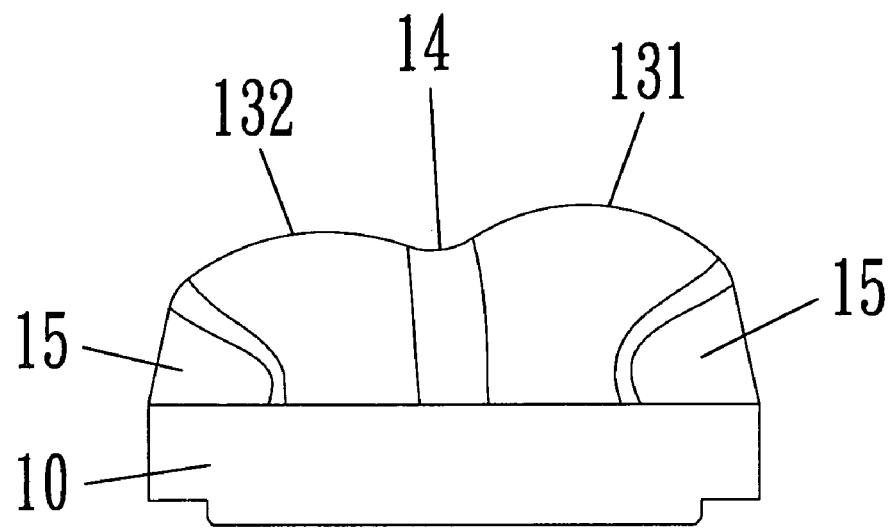
FIG. 3 is a front view of the two-side illuminating lens body of the present invention.
Figure 4:
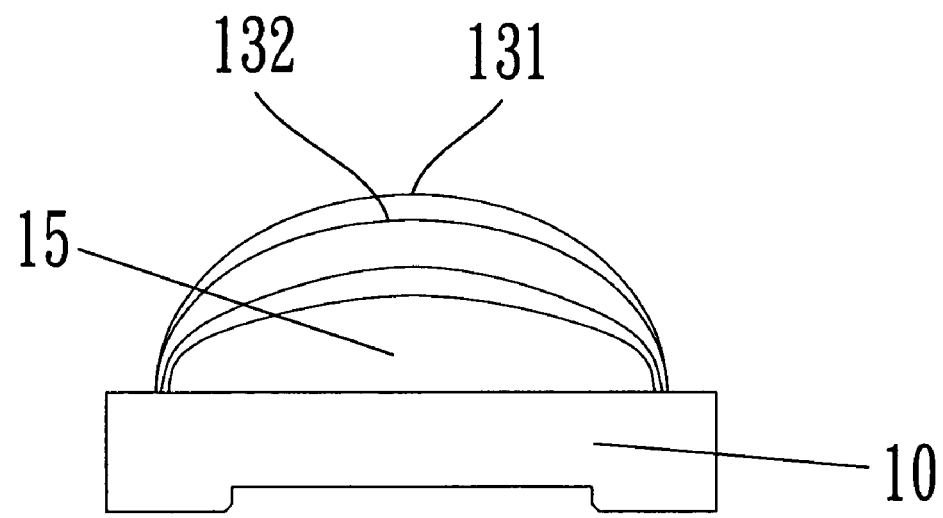
FIG. 4 is a lateral view of the two-side illuminating lens body of the present invention.
Figure 5:
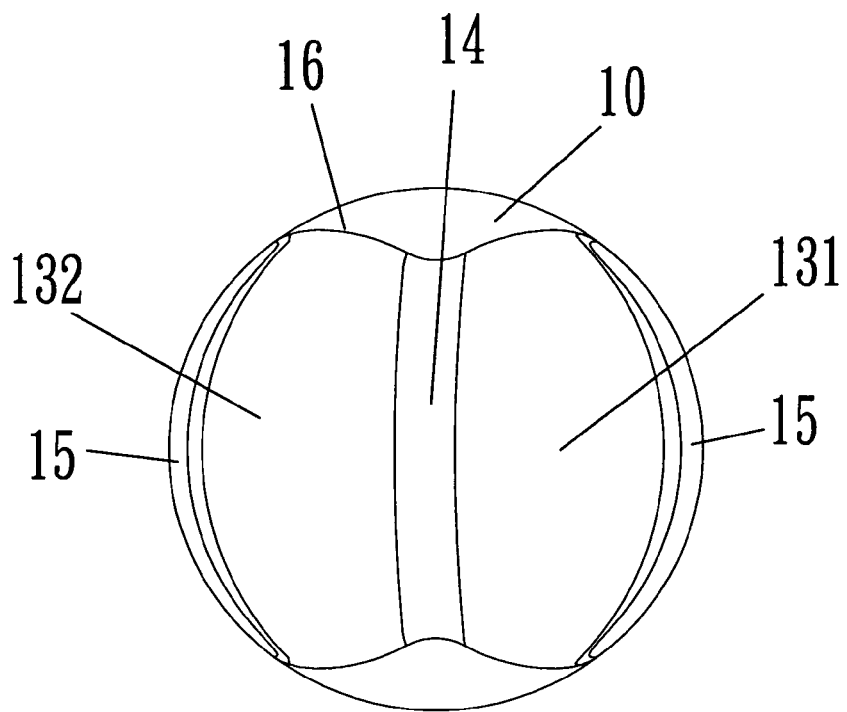
FIG. 5 is a top view of the two-side illuminating lens body of the present invention.
Figure 6:
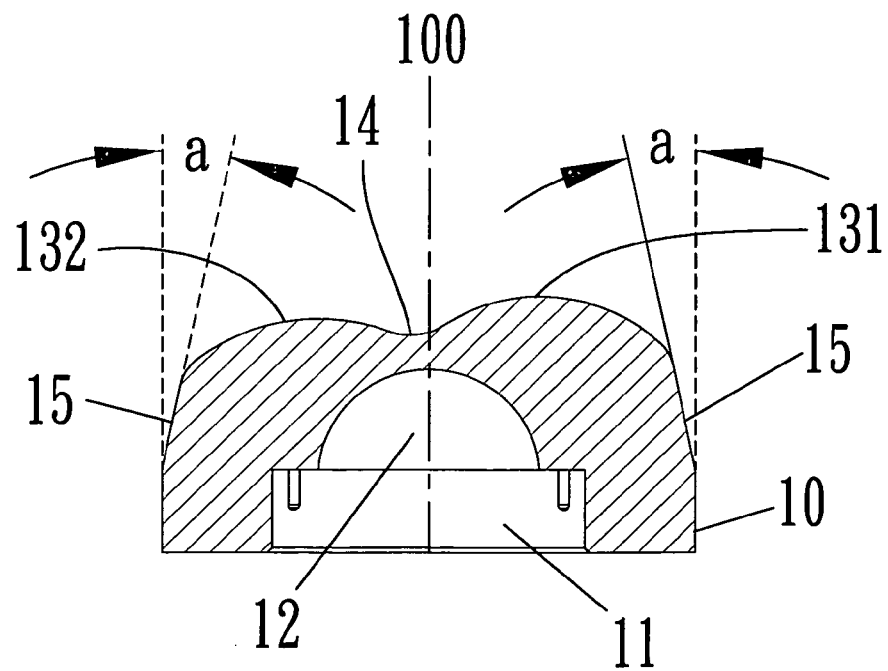
FIG. 6 is a front cross section view of the two-side illuminating lens body of the present invention.
Figure 7:
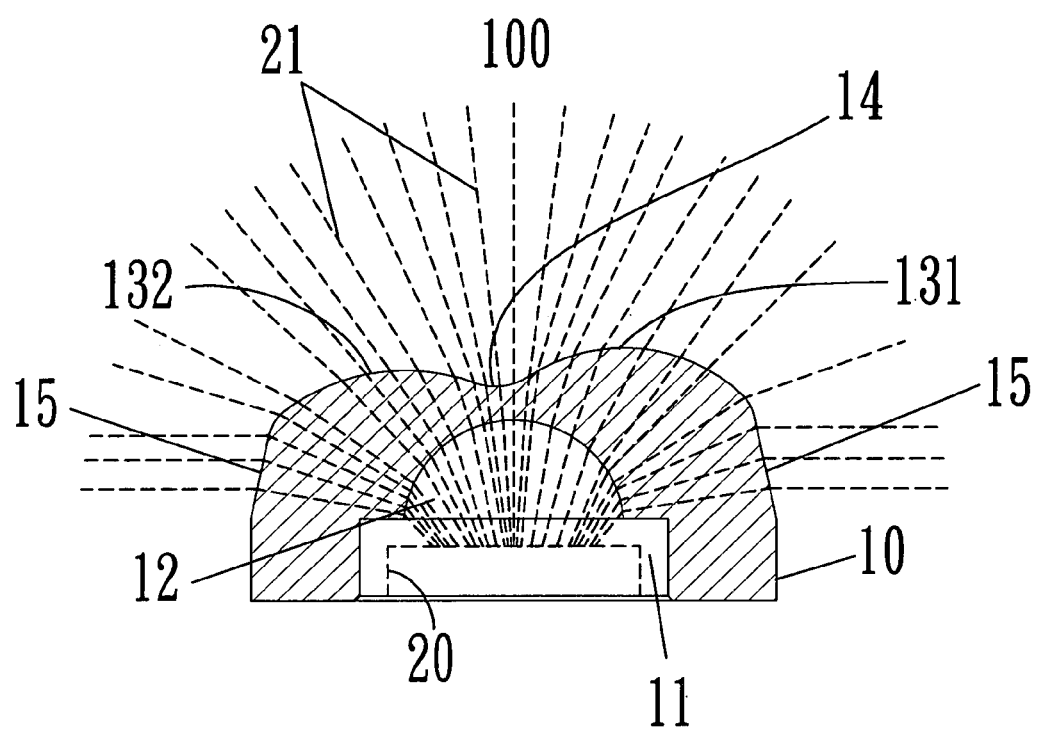
FIG. 7 is a front cross section view of the two-side illuminating lens body of the present invention and a schematic view showing refractions of light.

Firstly, referring to FIGS. 1 to 7, a preferable embodiment of two-side asymmetric illuminating lens body according to the present invention is illustrated. The lens body includes a highly transparent base 10 with a receiving slot 11 having a downwards opening for receiving and positioning a lighting, device 20. A concave arc 12 for receiving the light emitting portion of the lighting device 20A is formed above the receiving slot 11 as a light incident side. A top surface of the base 10 is arranged with a non-spherical large protrusion 131 and a non-spherical small protrusion 132 which are arranged asymmetrical and are spaced with a predetermined spacing on two sides of a center light axis 100. A concave curved surface 14 is formed to a border of the two asymmetric non-spherical protrusions 131 and 132. An outer edge of each non-spherical protrusions 131, 132 is formed with a respective cambered convex lateral 15. A thickness of the concave curved surface 14 is gradually reduced outwards from the center light axis 100. A thickness of each non-spherical protrusion 131, 132 is gradually reduced outwards from a highest point thereof. The top surface of the two-side illuminating lens body is generally like continuous waves from a front view (as shown in FIG. 3), or like an asymmetric butterfly 16 with spread wings from a top view (as shown in FIG. 5).

Accordingly, rays 21 emitted from the lighting device 20 will go through the concave arc 12 which is the incident side and be projected from three light projecting sides of concave curved surface 14, the non-spherical protrusions 131, 132, and the cambered convex laterals 15. The design of the three light projecting sides will gradually enlarge refracting angles from the center light axis 100 to present a light up area as a shape of asymmetric butterfly (as shown in FIG. 8). The base 10 is a asymmetrical cylinder body based on the center light axis 100, and a distribution of light is depend on a distance between the highest point of the non-spherical protrusions 131, 132 to the top surface of the base 10, a distance between the highest point of the non-spherical protrusions 131, 132 to the center light axis 100, and a height difference between the highest point of the non-spherical protrusions 131, 132 to a lowest point of the concave curved surface 14.

Moreover, the cambered convex laterals 15 on the relative outer sides of the non-spherical protrusions 131, 132 are gradually narrowed along the projecting direction of the center light axis 100, an angle a which is about 10 degrees is between a tangent line of the cambered convex lateral and the center light axis 100. Rays 21 emitted from the light device 20 will be refracted to two outer directions based on the center light axis 100 by the concave arc 12 and go into the non-spherical protrusions 131, 132. The rays 21 will be further diffusely refracted by the non-spherical protrusions 131, 132, concave curved surface 14, and the cambered convex laterals 15. By the cambered convex laterals 15, the second refraction will have the rays 21 covered almost 180 degrees of projecting angle.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A two-side asymmetric light-shift illuminating lens body comprising a base having a receiving slot with a downwards opening for receiving a lighting device; a large non-spherical protrusion and a small a large non-spherical protrusion being arranged on two sides of a center light axis on a top surface of the base; a concave curved surface being formed to a border of the two non-spherical protrusions; a concave arc is formed above the receiving slot, outer edge of each non-spherical protrusion being formed with a cambered convex lateral.

2. The two-side illuminating lens body as claimed in claim 1, wherein the cambered convex laterals are gradually narrowed along the projecting direction of the center light axis.

3. The two-side illuminating lens body as claimed in claim 1, wherein an angle between a tangent line of the cambered convex lateral and the center light axis is about 10 degrees.

* * * * *